(12) United States Patent
Lu et al.

(10) Patent No.: US 6,252,623 B1
(45) Date of Patent: Jun. 26, 2001

(54) THREE DIMENSIONAL IMAGING SYSTEM

(75) Inventors: Taiwei Lu, Rohnert Park, CA (US); Jianzhong Zhang, State College, PA (US)

(73) Assignee: 3DMetrics, Incorporated, Petaluma, CA (US)

( * ) Notice: Subject to any disclaimer, the term of this patent is extended or adjusted under 35 U.S.C. 154(b) by 0 days.

(21) Appl. No.: 09/080,135

(22) Filed: May 15, 1998

(51) Int. Cl.[7] .................................................. H04N 7/18
(52) U.S. Cl. ................................................ 348/47; 348/42
(58) Field of Search .............................. 348/47, 154, 42; 356/374, 237, 376

(56) References Cited

U.S. PATENT DOCUMENTS

| | | | |
|---|---|---|---|
| 3,589,815 | 6/1971 | Hosterman | 356/167 |
| 3,625,618 | 12/1971 | Bickel | 356/120 |
| 4,247,177 | 1/1981 | Marks et al. | 351/44 |
| 4,299,491 | 11/1981 | Waters et al. | 356/376 |
| 4,349,277 | 9/1982 | Mundy et al. | |
| 4,375,921 | 3/1983 | Morander | 356/381 |
| 4,473,750 | 9/1984 | Oshida et al. | 250/560 |
| 4,494,874 | 1/1985 | DiMatteo et al. | 356/376 |
| 4,532,723 | 8/1985 | Kellie et al. | 356/73 |
| 4,594,001 | 6/1986 | DiMatteo | 356/376 |
| 4,764,016 | 8/1988 | Johansson | 356/371 |
| 4,935,635 | 6/1990 | O'Harra | 250/560 |
| 4,979,815 | 12/1990 | Tsikos | 356/1 |
| 4,983,043 | 1/1991 | Harding | 356/376 |
| 5,085,502 | * 2/1992 | Womack et al. | 356/376 |
| 5,189,493 | 2/1993 | Harding | 356/376 |
| 5,289,264 | * 2/1994 | Steinbichler | 356/376 |
| 5,367,378 | 11/1994 | Harding et al. | 356/371 |
| 5,500,737 | 3/1996 | Donaldson et al. | 356/376 |
| 5,568,263 | 10/1996 | Hanna | 356/385 |
| 5,615,003 | 3/1997 | Hermary et al. | |
| 5,640,962 | 6/1997 | Jean et al. | |
| 5,646,733 | 7/1997 | Bieman | 356/376 |
| 5,661,667 | 8/1997 | Rueb et al. | 364/525 |
| 5,675,407 | 10/1997 | Geng | 356/147 |

FOREIGN PATENT DOCUMENTS 0076866   10/1981   (EP) .

OTHER PUBLICATIONS

K.L. Boyer and A.C. Kak, "Color–encoded structured light for rapid active ranging," *IEEE Transactions on Pattern Analysis and Machine Intelligence*, vol. PAMI–9, pp. 14–28, 1987.

J. Taijima, M. Iwakawa, "3–D data acquisition by rainbow range finder," Proc. of the 10th International Conference on Pattern Recognition, pp. 309–313, 1990.

Z.J. Geng, "Rainbow Three–Dimensional Camera: New Concept of High–Speed Three–dimensional Vision Systems," *Opt. Eng. 35*, pp. 376–383, 1996.

(List continued on next page.)

*Primary Examiner*—Andy Rao
(74) *Attorney, Agent, or Firm*—Ladas & Parry (57) ABSTRACT

A method and apparatus for imaging three dimensional objects is described which has a source of illumination that is projected through a color grating onto the object to be imaged. A camera captures an image from the object which reflects the pattern imposed by the grating, and a series of mathematical operations are then performed on the data from the captured image to deduce three dimensional information about the object. The grating includes a repetitive pattern of parallel colored bars disposed a predetermined distance from each other, and includes an opaque area intermediate each of the colored bars to enhance the accuracy of the image by reducing cross-talk between the color bars of the captured image. One exposure of the object can provide information sufficient to calculate the 3-D profile of the object, making the system especially useful for imaging moving or living objects.

23 Claims, 5 Drawing Sheets

OTHER PUBLICATIONS

T. Sato, "Multispectral Pattern Projection Range Finder," *SPIE* vol. 3640, pp. 28–37, 1999.

C. Wust and D.W. Capson. "Surface Profile Measurement Using Color Fringe Projection," *Machine Vision and Applications*, 4, pp. 193–203, 1991.

T.P. Monks, J.N. Carter, and C.H. Shadle, "Color–Encoded Structured Light for Digitization of Real–Time 3D Data," IEE 4th International Conference on Image Processing, Maastricht, The Netherlands, Apr. 7–9, 1992.

T.P. Monks and J.N. Carter, "Improved Stripe Matching for Colour Encoded Structured Light," Proceedings of International Conference on Computer Analysis of Images and Patterns, pp. 476–485, 1993.

J. Salvi, J. Batlle, and E. Mouaddib, "A Robust–Coded Pattern Projection for Dynamic 3D Scene Measurement," *Pattern Recognition Letters*, 19, pp. 1055–1065, 1998.

E. Schubert, H. Rath, and J. Klicker, "Fast 3D Object Recognition Using a Combination of Color–Coded Phase–Shift Principle and Colour–Coded Triangulation," *SPIE* vol. 2247, pp. 202–213, 1994.

C. Chen, Y. Hung, C. Chiang, and J. Wu, "Range Data Acquisition Using Color Structured Lighting and Stereo Vision," *Image and Vision Computing*, 15, p. 445–456, 1997.

K.G. Harding, M.P. Coletta, and C.H. VanDommelen, "Color Encoded Moire Contouring," *SPIE* vol. 1005, pp. 169–178, 1988.

Z. Yang and Y. Wang, "Error Analysis of 3D Shape Construction from Structured Lighting," *Pattern Recognition*, 29, pp. 189–206, 1996.

E. Trucco, R.B. Fisher, A.W. Fitzgibbon, and D.K. Naidu, "Calibration, Data Consistency and Model Acquisition with Laser Stripers," *Int. J. Computer Integrated Manufacturing*, 11, pp. 293–310, 1998.

G. Zhang and H. Wang, "Method of Establishing General Mathematical Model of Structured Light 3D Vision," *SPIE*, 2899, pp. 662–666, 1996.

P.J. Besl, "Active, Optical Range Imaging Sensors," *Machine Vision and Applications*, 1, pp. 127–152, 1988.

F. Blais and M. Rioux, "Real–time numerical peak detector," *Signal Processing*, 11, pp. 145–155, 1986.

Tajima, Johji, et al., "3–D Data Acquisition by Rainbow Range Finder," 10th International Conference on Pattern Recognition, pp. 309–313 (Jun. 1990).

Wust, Clarence, et al., "Surface Profiled Measurement Using Color Fringe Projection," Machine Vision and Applications, pp. 193–203 (1991).

* cited by examiner

THREE DIMENSIONAL IMAGING SYSTEM

BACKGROUND OF THE INVENTION

1. Field of the Invention

The present invention, in general relates to both a method and apparatus for three-dimensional surface profile measurement systems and, more particularly, to multi-color imaging systems.

Three-dimensional (hereinafter also referred to as either "3D" or "3-D") imaging systems are known. In general, the purpose is to determine the shape of an object in three dimensions so that it can be either better understood, or if appropriate, reproduced. Ideally, the absolute value (dimensions) of the object are obtained as well. Such types of systems fall into two basic categories which are: 1) Optical Systems and 2) Surface Contact Systems.

Surface Contact Systems rely upon a stylus probe that uses a mechanical contact tip to probe the surface of an object. The information about variations in the depth of the contact tip of the probe at any given point along the surface of an object directly correlate to the depth of the object. Height and width data is determined merely by the position of the contact tip along an "x" and "y" axis. This information is then "digitized" for use in computer based systems or by numerically-controlled machines, as are well known in the respective arts.

Surface Contact Systems involve very slow and tedious manual operation for the probe to traverse an object. The ability to resolve detail is dependent upon the density (number of) scan passes made of an object. The more detail desired, the slower the process. Also the size of the contact tip of the probe precludes access from minute areas of the object, thereby providing inaccurate results.

Also, there are objects which are of a fragile nature, such as a butterfly for example, that precludes the making of any actual physical contact by a probe tip with the object. Also, contact based systems are not suitable for use with moving objects. Furthermore, the digitization of live objects, such as a person, cannot be easily accomplished with such systems because of the discomfort and innate resistance associated with standing still for protracted periods of time and also the discomfort arising from contact with a probe tip. Clearly, the applications and utility of such systems are limited.

Optical systems, in general, acquire a plurality of images of an object which are taken by various means. These images contain reflected patterns of light energy that are compared and processed by various known mathematical algorithms to obtain data relating to the three dimensions of the object. Often, calibration with an object of known dimensions precedes the use of such types of systems if the absolute value of the various dimensions are desired (instead of relative data).

Currently the generally known types of optically based 3D imaging technologies are discussed briefly below:

Laser Triangulation: This approach uses a laser spot or a laser line to scan an object. A detector array in another angle receives the signal and calculates the triangulation angle related to the Z distance. It takes anywhere from a few seconds to minutes to take a 3D image of an object. This is too slow for taking 3D images of a live object, and the laser beam is potentially harmful to the eyes.

Structured Illumination: This approach projects a structured light pattern on an object, then analyzes the deformation of the reflected light pattern as imaged by a two dimension detector array to calculate the "Z" distance, or depth. It has the problem of matching each pattern in the reflected image with the illumination pattern. This can produce ambiguity in the results thus obtained. This is because the accuracy of the measurement is not high because a group of pixels, rather than a single pixel, is used to calculate the "Z" distance, again introducing ambiguity in the results.

Optical Moiré and Interferometer: In order to resolve the ambiguity problem and to increase the accuracy of the measurement, such types of imaging systems rely upon measurement of the optical phase shift of reflected patterns of light to obtain and digitize the dimensional information of an object. It is necessary to move an optical grating, through which a pattern of light is projected unto the object, three to four times and to take three to four consecutive images in order to apply the mathematical formulae necessary to calculate the phase shift and extract the dimensional data from the reflected images.

Moiré and Interferometer based systems are more accurate, but they are also expensive and difficult to use. In most cases, such systems also need to acquire multiple exposures, which makes them unsuitable for live object digitization. Attempts have been made to use three color gratings to perform a phase shift Moiré operation. But such attempts have been unsuccessful because they could not improve the cross talk between the color bands present in the grating (and projected on the object).

Stereoscopic Imaging: This approach uses two cameras to map the 3D surface of an object. They require identification of common features in both images, such as edges and corners. Thus they can not extract Z distance information from a single pixel, but must also extrapolate this information from a group of pixels, resulting once again in inaccuracy. The matching of the features with the actual object also requires heavy computation.

Time-of-Flight Method: This approach relies upon a short pulsed laser beam that hits the surface of the object and by calculating the time delay of the light traveling from the laser transmitter to the object surface and back to a receiver. This method requires the scanning of a laser point on the object surface and so it is also slow. It also requires a very high speed laser transmitter-receiver, therefore it is expensive.

Accordingly there exists today a need for a three dimensional imaging system that relies upon optical technologies, which is suitable for use on live or moving objects, which is fast to use, and which is inexpensive to manufacture, and which does not require especially complex mathematical computations to determine the dimensions of an object.

Clearly, such an apparatus and method is useful and desirable.

2. Description of Prior Art

Three dimensional imaging systems and methods are, in general, known. For example, the following patents describe various types of these devices:

U.S. Pat. No. 3,589,815 to Hosterman, Jun. 29, 1971;
U.S. Pat. No. 3,625,618 to Bickel, Dec. 7, 1971;
U.S. Pat. No. 4,247,177 to Marks et al, Jan. 27, 1981;
U.S. Pat. No. 4,299,491 to Thornton et al, Nov. 10, 1981;
U.S. Pat. No. 4,375,921 to Morander, Mar. 8, 1983;
U.S. Pat. No. 4,473,750 to Isoda et al, Sep. 25, 1984;
U.S. Pat. No. 4,494,874 to DiMatteo et al, Jan. 22, 1985;
U.S. Pat. No. 4,532,723 to Kellie et al, Aug. 6, 1985;
U.S. Pat. No. 4,594,001 to DiMatteo et al, Jun. 10, 1986;

U.S. Pat. No. 4,764,016 to Johansson, Aug. 16, 1988;
U.S. Pat. No. 4,935,635 to O'Harra, Jun. 19, 1990;
U.S. Pat. No. 4,979,815 to Tsikos, Dec. 25, 1990;
U.S. Pat. No. 4,983,043 to Harding, Jan. 8, 1991;
U.S. Pat. No. 5,189,493 to Harding, Feb. 23, 1993;
U.S. Pat. No. 5,367,378 to Boehnlein et al, Nov. 22, 1994;
U.S. Pat. No. 5,500,737 to Donaldson et al, Mar. 19, 1996;
U.S. Pat. No. 5,568,263 to Hanna, Oct. 22, 1996;
U.S. Pat. No. 5,646,733 to Bieman, Jul. 8, 1997;
U.S. Pat. No. 5,661,667 to Bordignon et al, Aug. 26, 1997; and
U.S. Pat. No. 5,675,407 to Geng, Oct. 7, 1997.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a three dimensional imaging system that is inexpensive to manufacture.

It is also an important object of the invention to provide a three dimensional imaging system that is easy to use.

Another object of the invention is to provide a three dimensional imaging system that projects a specially designed color-coded light pattern onto an object.

Still another object of the invention is to provide a three dimensional imaging system that includes an improved color grating.

Still yet another object of the invention is to provide a three dimensional imaging system that can be used to project an image onto an object.

Yet another important object of the invention is to provide a three dimensional imaging system that can be used with a moving object.

Still yet another important object of the invention is to provide a three dimensional imaging system that can be used with a living object.

One other object of the invention is to provide a three dimensional imaging system that reduces crosstalk.

A further object of the invention is to provide a three dimensional imaging system that can obtain a phase shifted image of an object from a single exposure.

A further important object of the invention is to provide a three dimensional imaging system that can utilize a conventional digital camera.

An additional object of the invention is to provide a three dimensional imaging system that can utilize a CCD motion camera.

An especially important object of the invention is to provide a method for obtaining a phase shifted image of an object suitable for determining the dimensional attributes of the object.

A further especially important object of the invention is to provide a method to project a structured illumination pattern onto an object.

A three dimensional imaging system in accordance with the preferred embodiments of the present invention includes a light source projecting a focused image onto an object through a system of lenses. The image is formed as the light from the source passes through an optical grating which contains a plurality of colored bars in a repeating pattern of alternating colors separated by black (opaque) spaces intermediate the colors. A minimum of three colors are included in the grating projected onto the object. A camera that is respective to the projected colors of the image captures the reflected image off of the object. The data captured by the camera is analyzed to calculate the hue of each color pixel and create a histogram of the hue of each of the colors. The data captured by the camera is separated into three image frames, one for each color if three colors as used, and a set of mathematical operations are performed on each of the image frames by a computer algorithm (program) to find the peak location of each color grating, regenerate the sinusoidal shape grating, calculate the phase of the object, perform a phase unwrapping, and calculate the 3-D profile of the object and output it as desired. The grating is periodic density structure on an optical plane and can be of glass, plastic, or film. When light passes through the plate, the light field is modulated to the grating structure. The disclosed grating includes at least three colors that are alternatively written onto the plane. The light source can be either a steady source of illumination, a stroboscopic source, or a flash, such as is used with a flash type of camera. One exposure of the object can provide information sufficient to calculate the 3-D profile of the object, making the system especially useful for imaging moving or living objects.

DETAILED DESCRIPTION OF THE INVENTION

Figure 1:
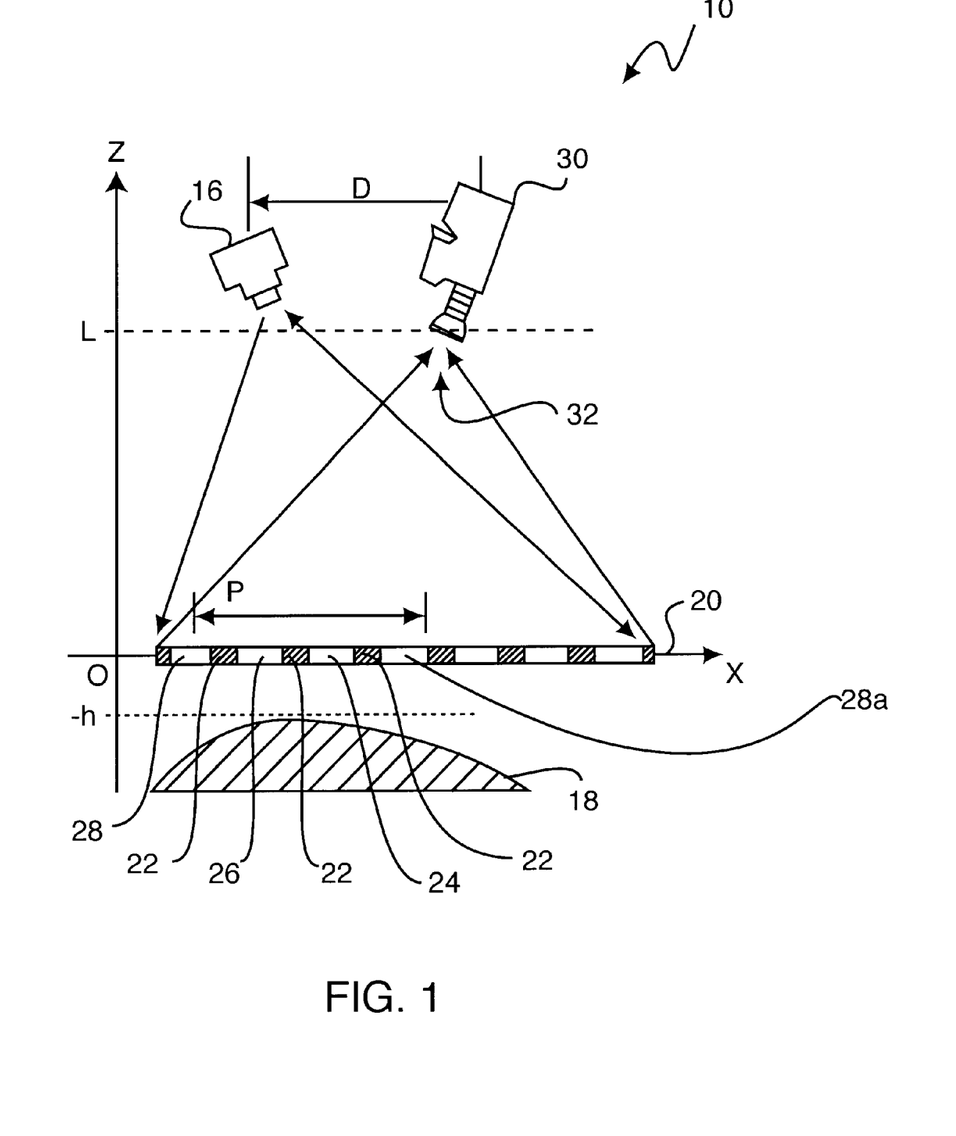
FIG. 1 is a block diagrammatic view of a three dimensional imaging system using a CCD type of motion picture camera.
Figure 2:
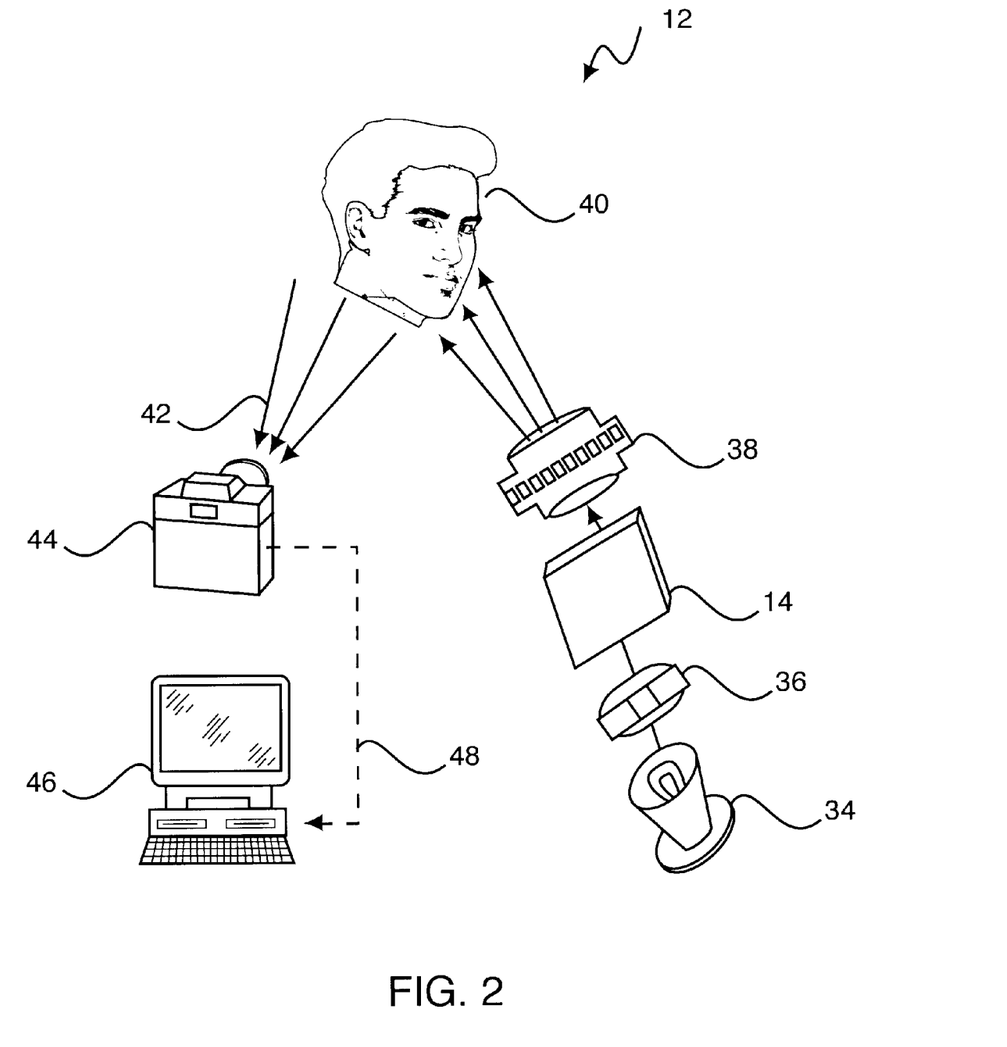
FIG. 2 is a block diagrammatic view of a modified three dimensional imaging system using a digital camera, showing the location of an improved grating in the system, and interface to a computer.
Figure 3:
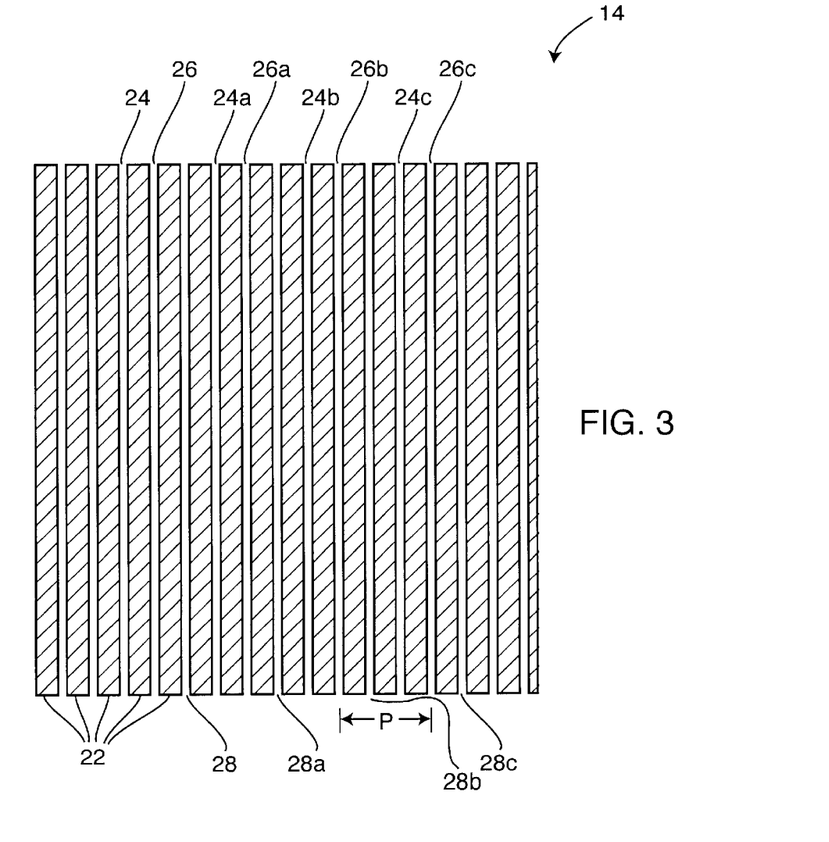
FIG. 3 is a front elevational view of an improved grating as is used with the three dimensional imaging system.

Referring to all of the FIGURE drawings on occasion, and in particular now to FIGS. 1, 2, and 3 is shown, a three dimensional imaging system in FIG. 1, identified in general by the reference numeral 10, a modified three dimensional imaging system, identified in general by the reference numeral 12 in FIG. 2, and a grating, identified in general by the reference numeral 14 in FIG. 3.

The system 10 includes a source of illumination 16 and the grating 14, although not shown in FIG. 1, is contained within the optical system of the source of illumination 16, and is therefore projected onto an object 18. Only a portion of the object is shown in FIG. 1 in cross-section to better illustrate the path that light takes when striking and reflecting off of the object 18. A more complete representation of the object 18 appears in FIG. 4, where the object 18 is better revealed to be a statue of the head of the goddess Venus.

A representation of a projected image 20 is shown disposed above the object 18 and would be the pattern broadcast upon the object 18 if it were perfectly flat and at that particular planar location with respect to the source of illumination 18.

Referring momentarily to FIG. 3, the grating 14 includes a repetitive pattern of parallel colored bars disposed a predetermined distance apart from each other and including an opaque area 22 intermediate each of the colored bars.

A red colored bar 24 repeats at a predetermined interval (distance) from each other red bar 24a, 24b, etc. The distance between the like-colored red bars 24, 24a (or any other repeated color) represents a period, "P".

After the red colored bar 24 the opaque area 22 is disposed intermediate a green colored bar 26, which also repeats at period "P" as was described above at green bars 26a, 26b, etc.

A blue colored bar 28 similarly repeats at period "P" at blue bars 28a, 28b, etc. Therefore three colored bars, red 24, green 26, and blue 28 each repeat at period "P" and each color is separated by the opaque area 22 between the various colored bars 24, 26, 28.

At least three colors are required to be simultaneously projected onto the object 18. Red, green, and blue are preferred because they correspond with the characteristics of a receptor of a CCD motion picture camera 30. However, any color may be used for any of the colored bars of the grating 14. If desired, more than three colors can be repeated in the lattice pattern of the grating 14.

The size of the period "P" has been exaggerated on the grating 14 and on the projected image 20, to provide improved clarity and is a design variable, as are the number of colors used, the actual colors used, the dimensions of the colored bars, and the size of the grating 14.

However, the opaque area 22 must be used intermediate each of the colored bars 24, 26, 28. The opaque area 22 greatly reduces crosstalk which would otherwise corrupt the projected image 20 as it strikes the object 18. Without the opaque area 22, the colors of the colored bars 24, 26, 28 would combine, blend, and be disproportionately absorbed and reflected by the object 18.

A reflected image, identified in general by the reference numeral 32, bounced off of the object 18 and is received by the CCD motion picture camera 30.

Having at least three colors arranged in a structured repetitive pattern on the grating 14 separated by the opaque area 22 serves the same function as taking three different exposures of the object 18 by moving the grating 14 intermediate each of the exposures.

As is described in greater detail hereinafter, the reflected image 32, which contains all of the colors that are part of the grating 14, is analyzed for each of the colors individually, which are then compared together to better correlate the reflected image 32 with the object 18. This process is known as phase shifting 3-D profilometry.

Normally, at least three separate exposures are required to accomplish this because of crosstalk problems, as was discussed hereinabove, that would arise if the three exposures were to simultaneously occur using a prior known type of color grating (not shown) without the opaque areas 22. The grating 14 allows for one exposure to provide the necessary phase shifted information in the reflected image 32, sufficiently free from unwanted crosstalk, with only one exposure of the object 22.

If desired, the object 18 is of a known source, having known dimensions and is used to calibrate the system 10. Then a second object (not shown) is "photographed" by the system 10 and the reflected image 32 is analyzed to more accurately determine the dimensions of the second object.

The distance between the source of illumination 16 and the CCD motion picture camera 30 is dimension "D" and is known during setup. Similarly the distance to the object 18 is also known.

The projected image 20 actually wraps around the object 18 and aligns itself with the contours of the object. The reflected image 32 reveals that the period "P" varies in accordance with the contour of the object 18 (See FIG. 4 for a fuller view of the object 18).

This information is analyzed, color by color, which are then compared to determine the dimensions along three axis (x,y,z) of the object 18. The resultant information can be downloaded to other computers to replicate the shape of the object (See FIG. 6 for a replication of the object 18).

The source of illumination 16 is a continuous source of light or a flash or a strobe. Ideally, if the object 18 is moving and a motion picture is to be made thereof, the source of illumination 16 is either a steady source of light or a repetitive strobe.

Referring now to FIG. 2, the modified system 12 shows a second source of illumination 34 which preferably is a flash or stroboscopic, or even a continuous source of illumination. The grating 14 is disposed intermediate a first lens 36 and a second lens 38, as is well known in optics, to momentarily cast, in focus, the projected image 20 onto the face of a man 40. A second reflected image 42 is received by a digital camera 44. The digitized data that the digital camera 44 captures of the second reflected image 42 is sent to a computer 46 through a data link, identified in general by the dashed line 48 where it is processed as was described hereinabove to determine 3-D information regarding the face of the man 40. The resultant file of "contour" data can be used by the computer 46 or sent to another computer (not shown) for processing as desired.

Figure 4:
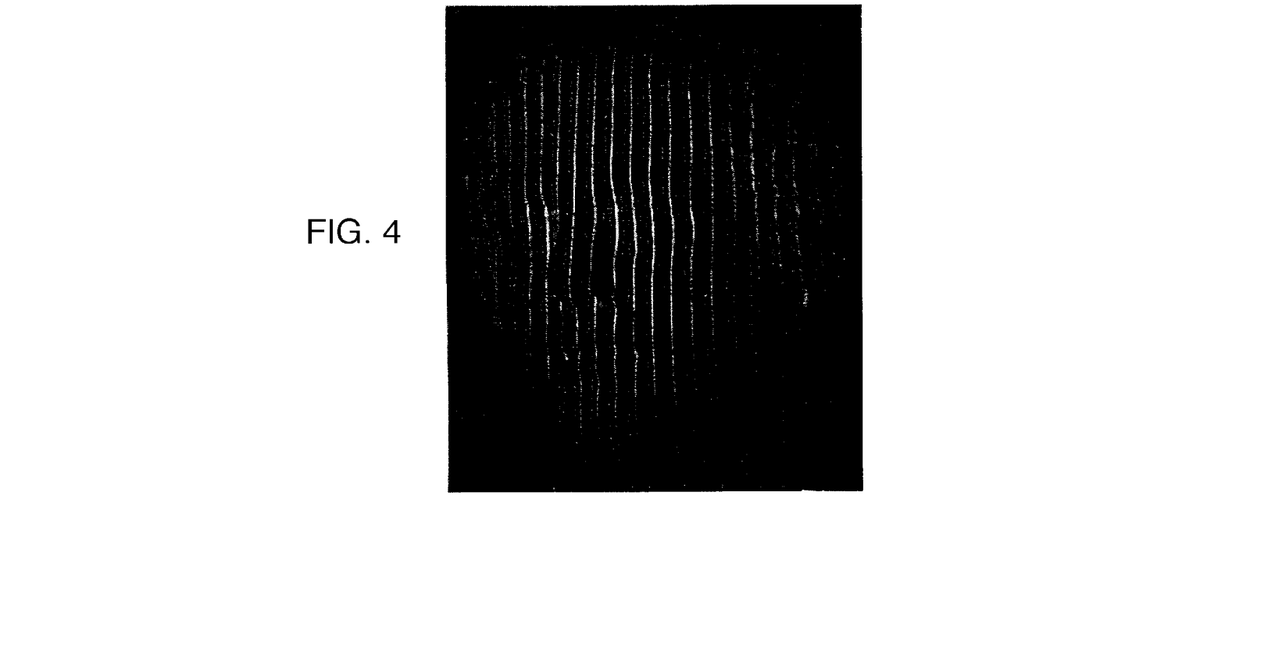
FIG. 4 is a color reflected image off of an object of a structured light pattern of the grating that is projected on the object as it is affected by the contour of the object.

Referring momentarily to FIG. 4, the object 18 reveals the reflected image 32 from the object 18. The reflected image 32 is formed from the light energy that is reflected off of the object 18 and shows the pattern that the projected image 20 forms. It can readily be seen how the period "P" varies depending upon the contour of the object 18.

In certain places, due to irregularities of the object 18 surface, the reflected image 32 contains brighter areas that might otherwise "fool" the computer 46 as it processed the data of thereof. A hue histogram of the reflected light is analyzed as desired to better determine the center of the position of each of the colored bars 24, 26, 28 of light and therefore, to better determine the phase shift information and eventually, the contour of the object 18.

Figure 6:
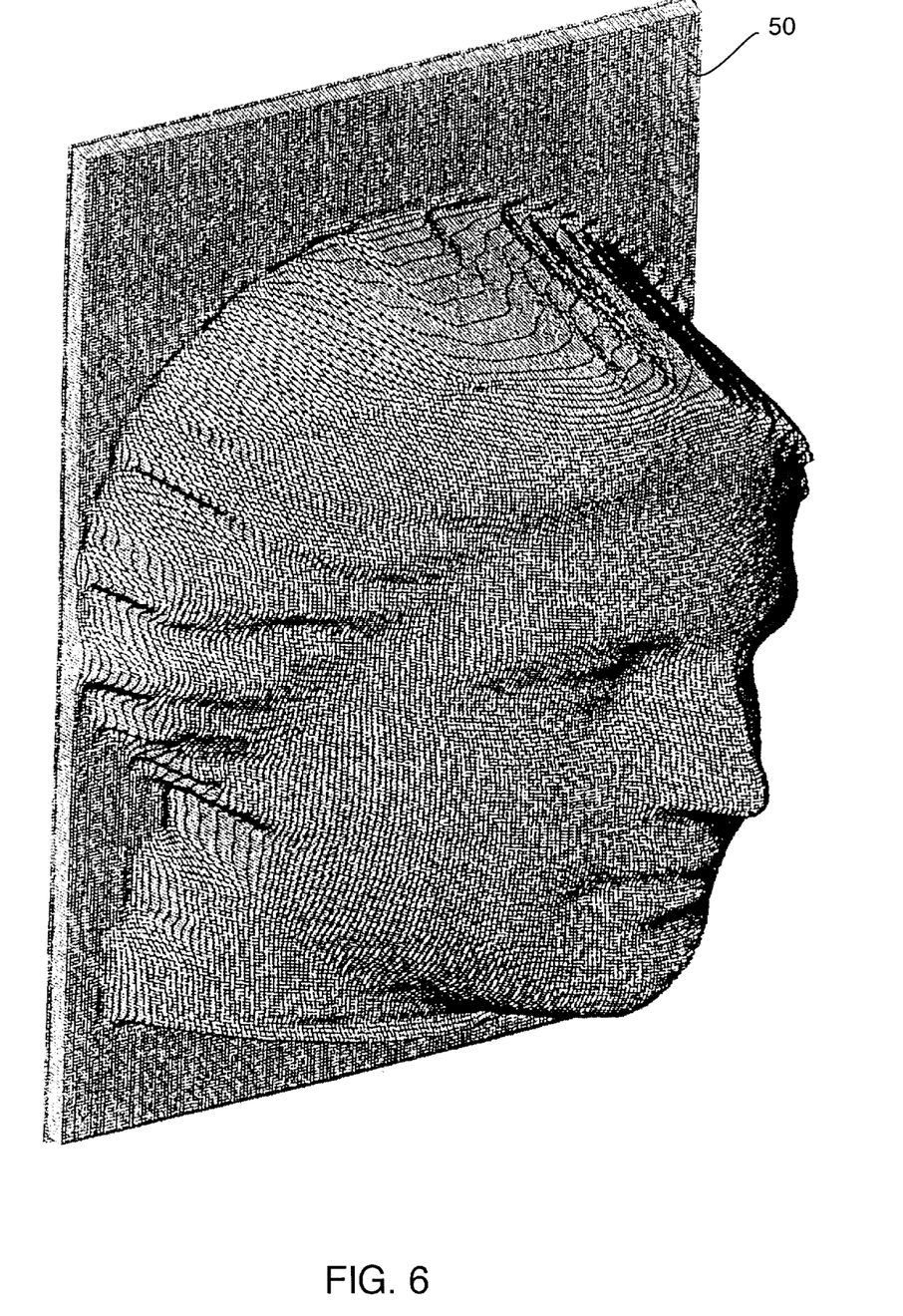
FIG. 6 is a view in perspective of a three-dimensional profile as obtained from the three dimensional imaging system after processing the data.

FIG. 6 shows a possible profile 50 generated by the computer 46 after processing the data of the reflected image 32 of the object 18 as obtained from either the digital camera 44 or the CCD motion picture camera 30. A similar profile (not shown) could be generated for the man 40 based on one flash exposure.

It has therefore been described how to obtain three dimensional information about the object 18 by use of the system 10 or the modified system 12 using a single exposure when the grating 14 contains at least three colors and the opaque areas 22 intermediate the colors. While the processing of this information includes both well known mathematical operations and computer algorithms to support those mathematical operations, it is understood that special tailored mathematical operations and algorithms will be developed for this purpose to simplify and speed processing of the reflected image 32 and also to provide increasing resolution detail and to better correlate the data with a position on the object 18.

The currently known mathematical operations are determinable by those possessing ordinary skill in the art in light of the above disclosure. However, for added clarity, the method as disclosed in the flowchart of FIG. 5 is included as one possible way to calculate the 3-D profile of the object 18 and is discussed in greater detail below.

Figure 5:
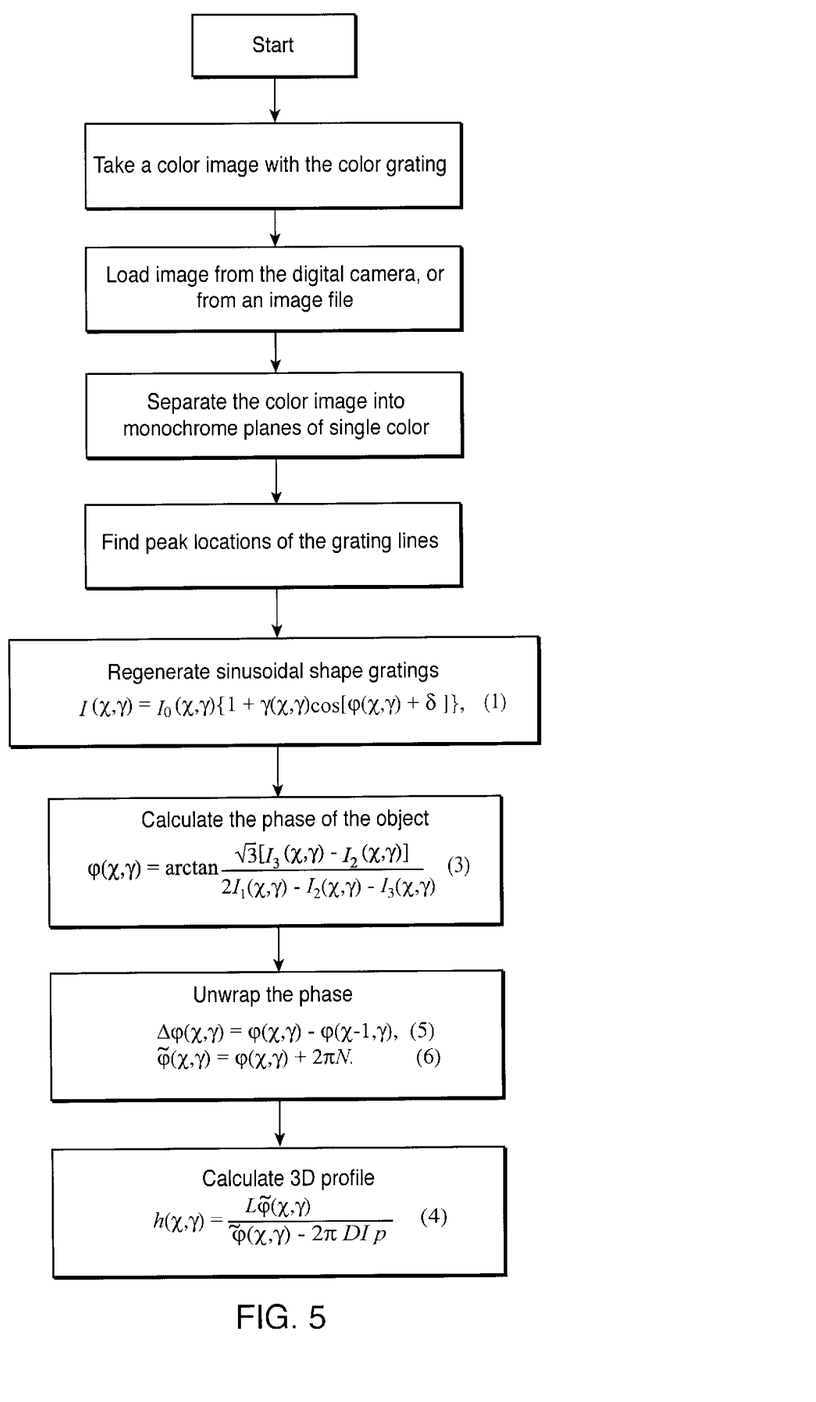
FIG. 5 is a flowchart of a set of mathematical operations that are performed on the reflected image for decoding a three dimensional image.

Referring also now to FIG. 5, the basic principle of phase-shifting 3-D profilometry can be briefly described as follows and is described in greater detail in reference numbers 3 and 5 of the reference list of publications that are included at the end of this technical discussion. By projecting a sinusoidal grating onto a diffuse object, the mathematical representation of the deformed optical grating may be expressed as:

$$I(x,y)=I_o(x,y)\{1+\gamma(x,y)\cos[\phi(x,y)+\delta]\}, \quad (1)$$

where $I_o(x, y)$ denotes the average radiant level; $\gamma(x,y)$ is the fringe modulation; $\phi(x,y)$ is the phase function that is related to the object shape—depth information, and $\delta$ is the phase-shift value. The phase-shifting method is based on changing the phase-shift value $\delta$. For example, by changing $\delta$ value three steps such as 0, $2\pi/3$, and $4\pi/3$, equation (1) will become the following set of three equations, $$\begin{cases} I_1(x, y) = I_0(x, y)\{1 + \gamma(x, y)\cos[\varphi(x, y) + 0]\} \\ I_2(x, y) = I_0(x, y)\{1 + \gamma(x, y)\cos[\varphi(x, y) + 2\pi/3]\}, \\ I_3(x, y) = I_0(x, y)\{1 + \gamma(x, y)\cos[\varphi(x, y) + 4\pi/3]\} \end{cases} \quad (2)$$

where $I_1(x,y)$, $I_2(x,y)$, and $I_3(x,y)$ correspond to the detected light intensity distribution of three steps. Based on equation (2), the phase function $\phi(x,y)$ can be directly derived in terms of $I_1(x, y)$, $I_2(x, y)$, and $I_3(x, y)$ without knowing the data of $I_o(x, y)$ and $\gamma(x,y)$. Mathematically, it can be expressed as, $$\varphi(x, y) = \arctan\frac{\sqrt{3}[I_3(x, y) - I_2(x, y)]}{2I_1(x, y) - I_2(x, y) - I_3(x, y)}. \quad (3)$$

Note that the calculated $\phi(x,y)$ is the wrapping phase. A phase-unwrapping process is required to change it to the true phase $\bar\phi(x,y)$ (as is described in Chapter 6 of reference number 3). Then, the 3-D profile of the object $h(x, y)$ can be derived by using the relationship between $h(x,y)$ and true phase $\bar\phi(x,y)$, (See reference 6) i.e., $$h(x, y) = \frac{L\bar\varphi(x, y)}{\bar\varphi(x, y) - 2\pi D/p}, \quad (4)$$

where L is a distance from the reference plane (i.e., the projected image 20) to the camera 30, D is a distance between the camera 30 and a projector (the source of illumination 16), and "P" is the grating pitch on the reference plane, as is shown in FIG. 1.

As mentioned previously, it takes at least three steps to get the depth information of the object. Multiple time sequence exposures were, in the past, required. This was done by physically moving the grating or moving it within software. In general, these techniques suffered because taking multiple images with the hardware uses valuable time, during which the object 18 may actually move and thereby distort the data, in particular for a living object such as the man 40. If the image is changed in the software, then the system can be fooled into interpreting reflectivity and illumination variations as moire pattern data.

To enhance the performance of projected grating or structured light technique, some previous efforts have been made recently by using color gratings or color-encoded structured light.

The previous state of art of color grating technique is accomplished by using color encoded Moire contouring technique (See reference number 7), in which two color gratings are required for the color encoded Moire contouring technique. In this method, three colors are used to represent and separate the three phase-shifting steps of the image. Thus, three colors used must be separable. Unfortunately, this is a complex problem. People are able to easily distinguish small variations in colors. The colors we see, however, are not necessarily separate bands of frequency in the frequency spectrum of light. In fact, two different combinations of frequencies of light can produce what appears to be the same color, or so called metamer colors.

Although these three bands of light can be detected by the color CCD camera 30 or the digital camera 44, these three bands typically overlap (i.e., what is known as color cross-talk) to some extent. A large amount of light at a narrow bandwidth of wavelengths is not necessarily distinguishable from a lesser amount of light spread over a wide region.

Therefore, the actual color spectrum to use in the gratings to create a Moire pattern must be well understood to ensure that the phase of a particular signal can be identified or separated from the adjacent phase. Again, as mentioned hereinabove, this is difficult, in particular, due to the non-linear response of the color detector such as the CCD camera 30 or the digital camera 44. The color cross-talk problem limits the practical application of color encoded Moire contouring techniques.

The indexing problem, that of matching a detected image plane stripe with its position in the projection grid, is solved from a knowledge of the color grid encoding (See reference number 8). Since the color-encoded structured light technique requires the scanning the light beam, again, it takes valuable time.

To avoid the need for multiple exposures and to overcome the color cross-talk problem, the grating 14 is used along with this decoding technique. FIG. 3 shows a black and white representation of this color grating 14, in which there is black space (the opaque area 22) between each of the colors.

Note that, although this grating 14 appears simple, it solves the long-standing the cross-talk problem and accordingly allows for the use of a single exposure of the object 18 containing a plurality of colors sufficient to obtain accurate dimensional data of the object 18. A newly developed decoding algorithm to work with this specially designed color grating 14 is described below.

The decoding algorithm and the operating procedure of this new technique can be described as follows:
Step 1. Take a picture of a 3D object with this unique color grating.
Step 2. Separate this color grating encoded picture (the reflected image 32) into three image frames, one for each color.

As was mentioned hereinabove, once the different colors are mixed (that occurs with prior types of gratings-not shown, the detector spectrum response, and the blurring or defocus effect of projected color grating image), it becomes very difficult to separate them because of the nonlinearity of the detector in the CCD camera 30 of the digital camera 44. While custom cameras (not shown) can be designed to work with the system 10 or the modified system 12, an economical advantage is realized by the ability to use "off-the-shelf" types of products.

To prevent different color lines from mixing in step 1, the specially designed color grating 14 is used. When this grating image is projected on the 3D surface of the object 18, there is almost no overlapping over the entire depth range of the 3D object as shown in FIG. 4.

Step 3. Find the peak location of each color grating.

To further minimize the cross-talk effect and the influence of the color of the object, a novel method of finding the location of each color grating line is disclosed. The hue of each color pixel is calculated and is used to draw a histogram (not shown) of the hue. There are three peaks in the histogram, which corresponds to the three dominant colors 24, 26, 28 of the grating 14 and therefore of the encoded object 18. If the object 18 is totally white and the color cross-talk effect can be ignored, these three dominant colors are very close to the colors of the original grating 14.

The three primary colors, red, green, and blue as used in the grating 14 would provide an ideal hue histogram under this ideal case. However, in reality, due to the cross-talk and the color of the object itself, the hue value of three dominant colors will be shifted.

Note that, due to the use of black space of the grating 14, the three peaks, corresponding to three dominant colors, can be clearly identified in the hue histogram without overlapping among them. In other words, there are clear "peace-keeping regions or zero value regions" among the peaks. Otherwise, the hue histogram will include overlapping areas of each of the colors 24, 26, 28. It is difficult to determine the three primary color regions without the opaque areas 22 of the grating 14.

However, as long as the reflection color spectrum of object contains the three primary color 24, 26, 28 of the grating 14, there are three separable peaks in the histogram. Therefore, the three hue value regions can be accurately determined. Each of them represents one set of data. For instance, Hue 1 region corresponds to zero phase shift, Hue 2 region corresponds to $2\pi/3$ phase-shifting, and Hue 3 region corresponds to $4\pi/3$ phase-shifting.

Step 4. Regenerate sinusoidal shape gratings.

As mentioned in the previous section, the phase-shifting method is based on sinusoidal shape grating as described by equations (1) and (2). However, to minimize the color cross-talk, the ideal projected shape gratings on the object 18 are rectangular. Since the location of rectangular grating lines is known by the hue calculation done in Step 3, it is possible to regenerate the sinusoidal shape primary color gratings (i.e., red, green, and blue gratings).

Step 5. Calculate the phase of the object.

The standard formula equation (3) is used to calculate the phase of the object. Right now, $I_1(x,y)$, $I_2(x,y)$, and $I_3(x,y)$ can be easily obtained from the sinusoidal shape color gratings.

Step 6. Perform a phase unwrapping.

The basic principle of phase unwrapping is to "integrate" the wrapped phase $\phi(x,y)$ (in units of $2\pi$) along a path through the data. At each pixel the phase gradient is calculated by differentiation;

$$\Delta\phi(x,y)=\phi(x,y)-\phi(x-1,y), \quad (5)$$

If $|\Delta\phi(x,y)|$ exceeds a certain threshold such as $\pi$, then a phase fringe edge ($2\pi$ discontinuity) is assumed. This phase jump is corrected by the addition or subtraction of $2\pi$ according to the sign of $\Delta\phi(x,y)$, and then a "current fringe order number counter" N can be maintained such that the phase at any point is given by $$\phi(x,y)=\phi(x,y)+2\pi N. \quad (6)$$

Thus, the true phase $\phi(x,y)$ can be obtained.

A standard sequential linear scanning phase unwrapping technique, as described in Chapter 6 of literature 3, is used to unwrap the phase. This method involves a sequential scan through the data, line by line. At the end of each line, the phase difference between the current line and the pixel on the line below is determined and the line below is scanned in the reverse direction. In other words, a two-dimensional data array is treated like a folded one-dimensional data set.

Step 7. Calculate the 3-D profile and output it.

After obtaining the true phase $\phi(x,y)$, the 3-D profile h(x, y) can be easily derived from equation (4).

REFERENCES

1. Mechanical contact probe, 3D Design Magazine, April 1998,
2. Marc Rioux, "Color 3-D electronic imaging of the surface of the human body," Optics and Lasers in Engineering 28, pp. 119–135 (1997).
3. David W. Robinson and Graeme T. Reid eds., *Interferogram Analysis*, Institute of Physics Publishing, Bristol and Philadelphia (1993).
4. Sadeg M. Faris, "Novel 3-D stereoscopic imaging technology," SPIE 2177, pp. 180–195, (1994).
5. Hua Fan, Hong Zhao, and Yushan Tan, "Automated three-dimensional surface profilometry using dual-frequency optic fiber phase-shifting method," Opt. Eng. 36, pp. 3167–3171 (1997).
6. Miwa Suganuma and Toru Yoshizawa, "Three-dimensional shape analysis by use of a projected grating image," Opt. Eng. 30, pp. 1529–1533 (1991).
7. Kevin G. Harding, Michael P. Coletta, and Carl H. VanDommelen, "Color encoded morie contouring," SPIE 1005, pp. 169–178 (1988).
8. K. L. Boyer, and A. C. Kak, "Color-encoded structured light for rapid active ranging," IEEE Transactions on Pattern Analysis and Machine Intelligence, Volume PAMI-9, pp. 25–39 (1987).

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A three dimensional imaging system for use in generating a profile of an object, comprising:

(a) a source of illumination;

(b) a grating adapted to cooperate with said source of illumination to project an image on said object, said grating including at least three different colors thereon in a spaced apart relationship, said at least three different colors allowing for the simultaneous passage of a portion of light from said source of illumination through each of said at least three different colors, said grating including an opaque section intermediate each of said at least three different colors to prevent the passage of light and thereby separate and prevent overlap of said different colors; and (c) means for detecting said image on said object.

2. The three dimensional imaging system of claim 1 wherein said source of illumination is a steady source of light.

3. The three dimensional imaging system of claim 1 wherein said source of illumination is a source of a pulse of light.

4. The three dimensional imaging system of claim 1 wherein said source of illumination is a strobe.

5. The three dimensional imaging system of claim 1 wherein said source of illumination is a flash.

6. The three dimensional imaging system of claim 1 wherein said grating is a periodic density structure on an optical plate.

7. The three dimensional imaging system of claim 6 wherein said plate is a glass.

8. The three dimensional imaging system of claim 6 wherein said plate is a plastic.

9. The three dimensional imaging system of claim 6 wherein said plate is a film.

10. The three dimensional imaging system of claim 1 wherein said least three different colors of said grating include a repetitive pattern of parallel colored bars disposed a predetermined distance from each other.

11. The three dimensional imaging system of claim 1 wherein said least three different colors of said grating include a plurality of colored bars in a repeating pattern of alternating colors separated by said opaque area intermediate each of said colored bars.

12. The three dimensional imaging system of claim 1 including an optical system of lenses adapted to cooperate with said source of illumination and said grating to focus said image on said object.

13. The three dimensional imaging system of claim 1 wherein said means for detecting said image includes a camera.

14. The three dimensional imaging system of claim 13 wherein said camera is adapted to output data about said image to a computer.

15. The three dimensional imaging system of claim 14 wherein said computer includes means for determining information about said object.

16. The three dimensional imaging system of claim 15 wherein said means for determining includes a computer program.

17. The three dimensional imaging system of claim 15 wherein said means for determining includes an algorithm for decoding phase shifting to determine three dimensional profilometry information about said object.

18. The three dimensional imaging system of claim 1 wherein said means for detecting said image includes a digital camera.

19. The three dimensional imaging system of claim 1 wherein said means for detecting said image includes a motion picture camera.

20. The three dimensional imaging system of claim 1 wherein said means for detecting said image includes a CCD type of a camera.

21. A method for three dimensional imaging of an object, which comprises:
  (a) projecting light simultaneously through all colors of a grating on to said object, said grating having a repetitive pattern of parallel colored bars disposed a predetermined distance apart and including an opaque area intermediate each of said parallel colored bars to prevent overlap and further separate said colored bars; and
  (b) detecting a pattern of said projected light that is reflected from said object.

22. The method for three dimensional imaging of an object of claim 21 including mathematically processing said pattern of light to determine the three dimensional profile of said object.

23. The method for three dimensional imaging of an object of claim 22 including the processing of a hue histogram by separating the colors and reconstructing the sinusoidal grating pattern to minimize the effect of color crosstalk.

* * * * *